ns

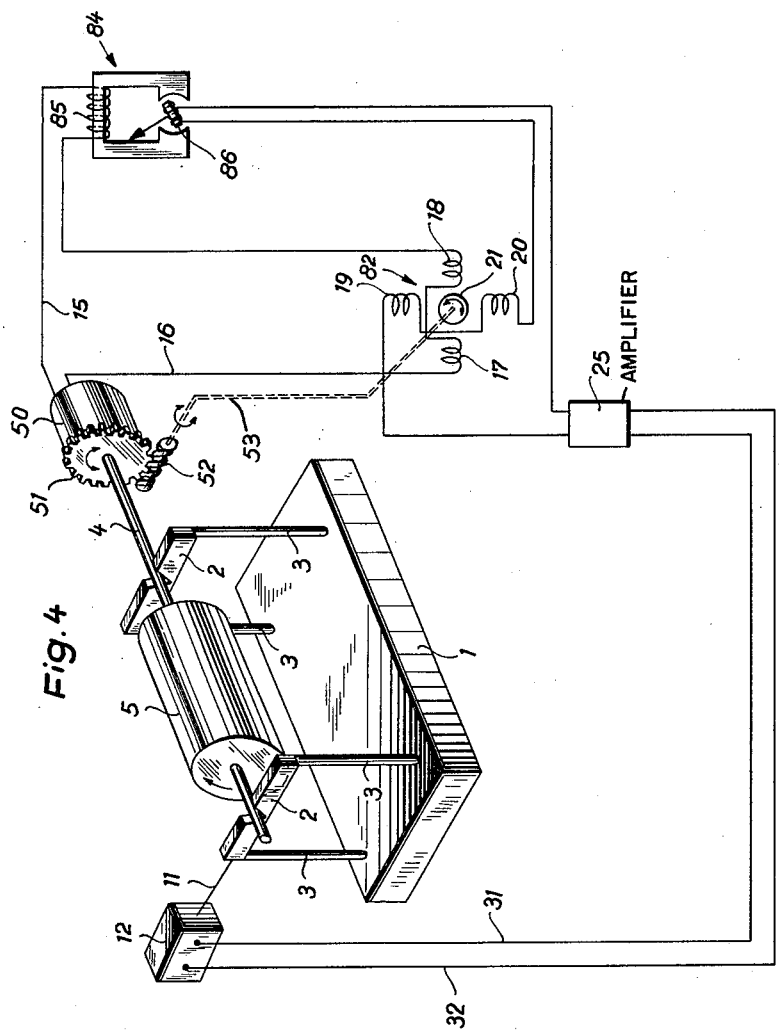

United States Patent Office 3,098,391
Patented July 23, 1963

3,098,391
APPARATUS FOR ELECTRICALLY MEASURING
UNBALANCE OF ROTATING WORKPIECES
Otfrid G. H. Maus and Alfred J. A. Giers, Darmstadt,
Germany, assignors to Carl Schenck Maschinenfabrik
G.m.b.H., Darmstadt, Germany, a corporation of Germany
Filed Aug. 1, 1958, Ser. No. 752,554
Claims priority, application Germany Aug. 10, 1957
5 Claims. (Cl. 73—462)

Our invention relates to apparatus for electrically measuring unbalance of rotating workpieces.

It is known to indicate the location and magnitude of unbalance by means of wattmeters which respond only to unbalance effects recurring at the frequency of workpiece rotation. It is often desired to use the indicated values for controlling the mechanical operation of unbalance-correcting devices or mechanically adjusting the phase shifters or compensators of the measuring equipment. For such purposes, the deflecting pointers of the wattmetric instruments must serve as regulating elements and must cooperate with a bank of contacts which selectively transmit the measured values to respective control circuits. Such accessory devices are expensive.

It is an object of our invention to provide apparatus for the frequency-responsive measuring of rotor unbalance, that afford a selective supply of mechanical power, in accordance with the measured unbalance values for effecting a mechanical displacement of compensating or control members in a simpler and more direct manner than in the known apparatus.

To this end, we provide one or more alternating current motors of the type having a rotor acted upon by two fields which are angularly displaced from each other and energized by respective mutually synchronous alternating voltages to impose a torque upon the rotor only if, and as long as, the two voltages are phase-displaced from each other. We energize one of the two motor fields in dependence upon an unbalance-responsive measuring voltage from an oscillation pickup, and we supply the other field voltage from an auxiliary reference-voltage generator controlled by the workpiece rotation, whereby both fields are excited in synchronism with the workpiece rotation and cause the rotor to rotate in one or the other direction in the event of phase difference. We further provide compensating means for eliminating such difference by displacement of a control member, and drive the member from the rotor in the direction required for obtaining phase balance, the amount of such displacement of the motor-driven member being then indicative of the unbalance component to be measured.

According to another feature of the invention, the above-mentioned auxiliary generator has two output voltages 90° phase displaced from each other, of which one is supplied to one of the two motor fields, whereas the other is compared with the unbalance-responsive voltage so as to form a difference voltage, preferably by means of a resistance potentiometer whose slidable tap contact is connected to the motor to be shifted to the position of phase balance.

The potentiometer or other compensating means may be calibrated to directly indicate the corresponding unbalance value in a way generally known. Due to the fact that the compensating means are power-driven, they can be readily used for control purposes or for mechanically driving and adjusting mechanical, magnetical or other data storing devices which memorize the unbalance data and transmit them to subsequently operating drill presses or other unbalance-correcting machines.

The motors used in apparatus according to the invention are preferably two-phase induction motors. They behave in analogy to the pointer instruments used for the known wattmetric balance-analyzing method, inasmuch as the motors, connected and operated as described above, response only to the fundamental frequency of the unbalance-responsive oscillations of the workpiece and thus secure a true measuring of unbalance as to magnitude and phase position.

For obtaining a given scale characteristic of unbalance indication, the resistance windings of the compensating potentiometer rheostats may be given a non-linear design, i.e. a non-linear dependence of the change in resistance upon the displacement of the slide contact. Furthermore, the mechanical displacement of the slide contacts may also be used to actuate a computer for transforming the unbalance coordinates.

The above-mentioned and other objects and features of the invention will be apparent from the following description in conjunction with the drawings, in which FIG. 1 is a schematic illustration of a balancing machine operating in accordance with the four-coordinate principle and provided with an apparatus according to the invention; and FIG. 1a shows a modified potentiometer applicable in such apparatus.

FIG. 4 shows a simplified embodiment of the invention.

Figure 1:
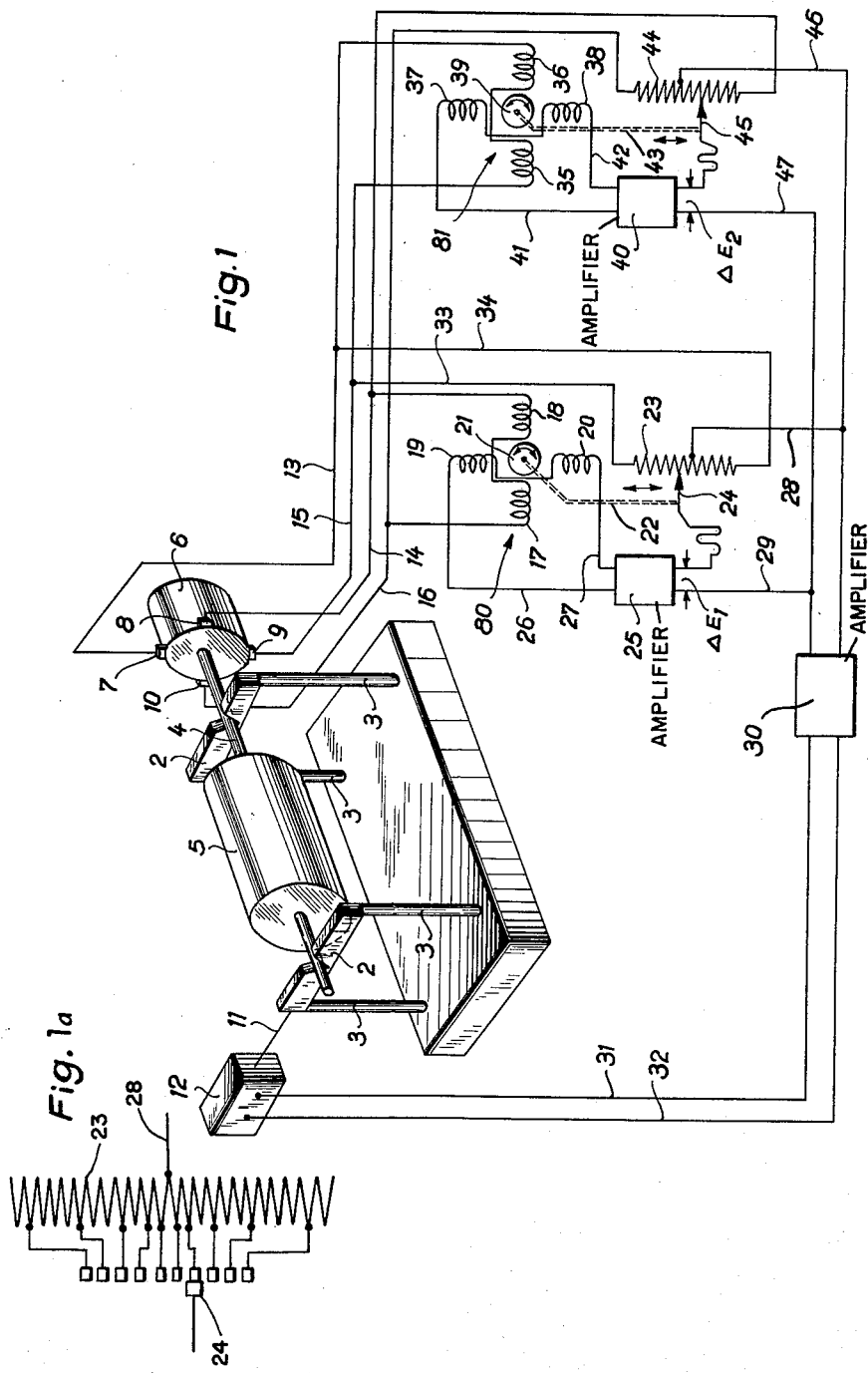

As illustrated in FIG. 1, the balancing apparatus is provided with bearing 2 softly supported in the horizontal plane and rigidly supported in the vertical plane by four supporting bars 3 on a base 1. The two bearings 2 are connected by respective tie rods 11 to two oscillation pickups 12 which may be of the moving-coil type, only one of these pickups being illustrated. The shaft 4 of the workpiece 5 to be tested is connected with an auxiliary generator 6 whose two pairs of output terminals furnish two sine-wave currents 90° phase displaced from each other and in synchronism with the rotation of the workpiece. The auxiliary generator may consist of any alternating-voltage producing means, such as a resistance-type generator, inductive generator, or a generator working on a photoelectric, magnetic or similar principle. The four alternating-voltage terminals 7, 8, 9, 10 of the auxiliary generator are connected to respective leads 13, 14, 15 and 16.

The alternating voltage produced by the oscillation pick-up 12 is applied to an amplifier 30 by leads 31, 32.

One output pole of the amplifier is connected by leads 28, 46 with fixed mid-taps of respective potentiometers 23, 44. The other output pole of amplifier 30 is connected to respective input leads 29, 47 of two amplifiers 25, 40 whose other input leads are connected to respective slide contacts 24 and 45 of the two potentiometers 23, 44.

Two coaxially aligned driving coils 17, 18 of a two-phase induction motor 80 are connected in series with each other between the leads 14 and 16 to be energized by one of the two alternating voltages from the auxiliary generator. The two other coils 19, 20, of motor 80 have a common axis extending at a right angle to that of coils 17 and 18. The coils 19 and 20 are energized in series with each other under control by a voltage $\Delta E_1$, which represents the difference between the unbalance-responsive alternating voltage from pickup 12, amplified by amplifier 30, and one of the alternating reference voltages from generator 6. The difference voltage $\Delta E_1$, amplified by amplifier 25, is impressed upon the two driving coils 19, 20 of motor 80 by means of two leads 26, 27. The rotor 21 of motor 80 is coupled through a flexible shaft 22 with the movable slide contact 24 of potentiometer 23, and, in the event of unbalance, shifts this contact until the difference voltage $\Delta E_1$ at amplifier 25 is zero and the rotor 21 ceases to rotate.

A second compensating potentiometer 44 and a second induction motor 81 operate in a similar manner. The two driving coils 35, 36 of motor 81 are connected in series between leads 13 and 15 and thus are energized by one of the alternating reference voltages produced by the auxiliary generator 6, whereas the potentiometer 44 is energized by the other alternating reference voltage 90° phase displaced from the one applied to coils 35, 36. The voltage produced by pickup 12 and amplified by amplifier 30 is supplied across the tapped-off portion of potentiometer 44 through leads 46, 47. The resulting difference voltage $\Delta E_2$ is impressed upon amplifier 40 whose output voltage is applied through leads 41, 42 to the other two series-connected coils 37, 38 of motor 81. The rotor 39 of motor 81 is connected by a flexible shaft 43 with the movable slide contact 45 of the compensating potentiometer 44. The motor 81 will run in the direction and to the extent required to reduce the difference voltage $\Delta E_2$ to zero.

Figure 2:
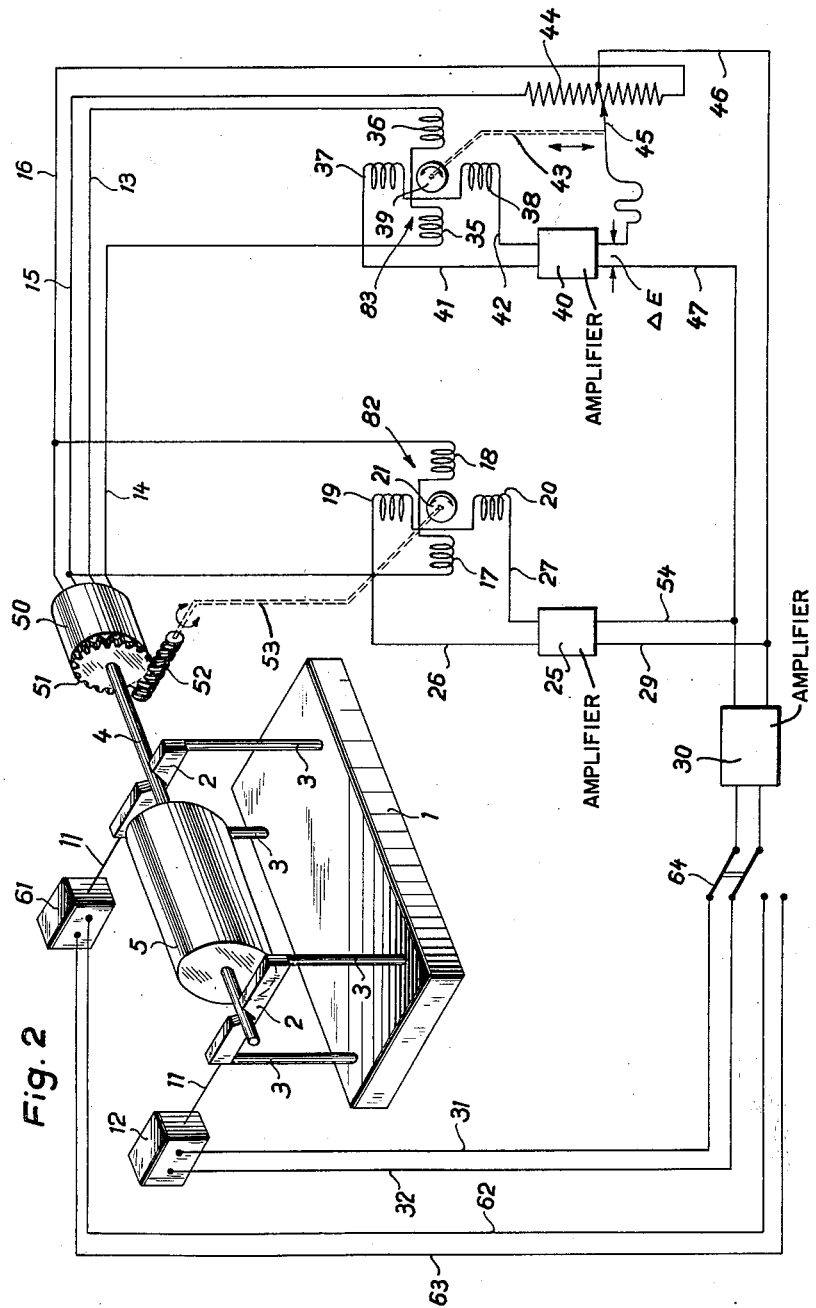
FIG. 2 is a schematic illustration of a machine for balancing according to the polar-coordinate method, with an apparatus according to the invention.
Figure 3:
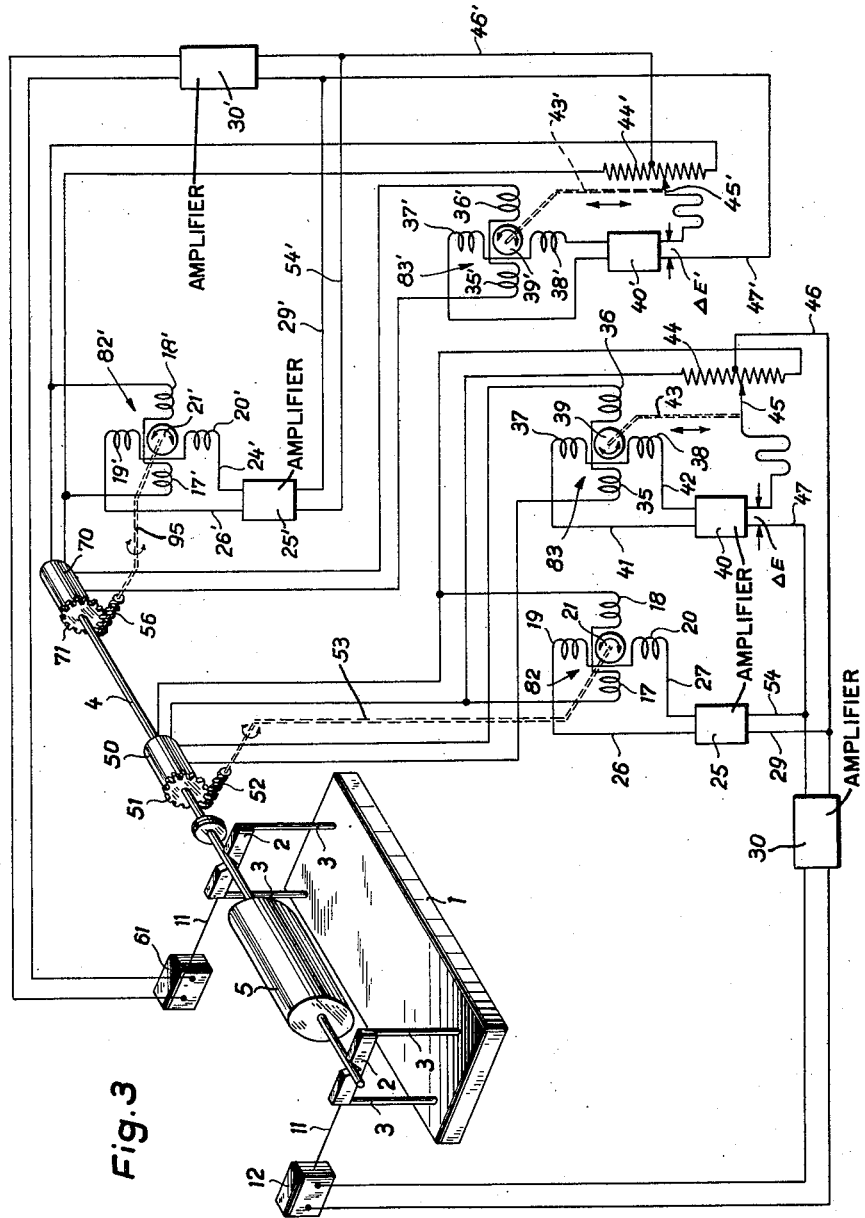
FIG. 3 shows another embodiment of the invention for balancing according to the polar method.

Two further compensating potentiometers, not shown, work together with the second oscillation pickup for the other bearing 2 of the balancing machine, the second pickup being not shown in FIG. 1 but corresponding to the one denoted by 61 in FIGS. 2 and 3. The second pickup and the corresponding two potentiometers with their respective control motors have a design, circuitry and performance exactly as described above with reference to pickup 12, potentiometers 23, 44 and motors 80, 81 so that it is not necessary to illustrate this second set of analogous components.

During operation, the four control motors operate to displace the respective four slide contacts of the compensating potentiometers until complete balance is attained. The respective end positions to which the four slide contacts are then adjusted represent a measure of the magnitude of unbalance. That is, the ultimate positions of the slide contacts 24 and 45 indicate the unbalance in a plane near the left bearing 2 by two coordinated components, and the respective positions of two other slide contacts indicate the corresponding unbalance components with reference to a plane near the right bearing 2 in the same manner as with the known four-coordinate wattmetric method. However, the displacements of the motor-driven slide contacts involves sufficient driving power to be mechanically transmitted to mechanical, magnetical or other value-storing devices for subsequent control of unbalance correcting operations such as drilling or other machining. The positioning of the slide contacts by the motors may also be used for indicating the unbalance.

As mentioned, the potentiometers may be given a non-linear graduation as may be desired for obtaining a given scale characteristic of indication, such a potentiometer being schematically shown in FIG. 1a.

The apparatus shown in FIG. 2 serves to determine unbalance by polar coordinates, i.e. vectorially as to magnitude and phase position. An auxiliary generator 50 with a rotationally displaceable stator is placed on the shaft 4 of the workpiece 5 to be tested. The adjustment of the stator is effected by means of a gear 51 driven by a worm 52. A flexible shaft 53 connects the worm 52 with the rotor 21 of a control motor 82.

The auxiliary generator 50 produces two sine-wave alternating voltages displaced 90° from each other, which are impressed upon two respective pairs of leads 13, 14 and 15, 16. The two driving coils 17 and 18 of motor 82 are energized by one of these alternating voltages. The two other driving coils 19 and 20 receive voltage through leads 26, 27 from an amplifier 25 whose input leads 29, 54 are connected to the oscillation pickup 12 by means of leads 31, 32, as well as through a switch 64 and, if necessary, an interposed amplifier 30. The motor 82 turns the stator of the generator 50, through the worm 52, until the amplified pickup currents in coils 19 and 20 have the same phase position as the currents in coils 17 and 18. The position of the stator then is a measure of the phase angle of the unbalance. The motor 83 with its series-connected driving coils 35 and 36 is likewise connected with one of the output voltages of the auxiliary generator 50, whereas the other output voltage, displaced 90°, is applied to the compensating potentiometer 44. A fixed midtap and a slide contact 45 of potentiometer 44 are connected by respective leads 46, 47 to pickup 12 or pickup 61, depending upon the selected position of switch 64. The difference voltage $\Delta E$ is amplified by amplifier 40 and impressed upon the two series-connected coils 37 and 38 of motor 83 through leads 41 and 42. The rotor 39 of motor 83 drives a flexible shaft 43 for positioning the slide contact 45 of the compensating potentiometer 44 until the output voltage of amplifier 40 is zero.

Measuring the unbalance in the two reference planes is effected successively. Switch 64 is first set for connecting amplifier 30 to the oscillation pickup 12. Thereafter the switch is set for connection with pickup 61. At the end of each balancing operation, the position of slide contact 45 is a measure of the unbalance magnitude, and the position of the stator of generator 50 is a measure of the angular position of the unbalance. Both values may be indicated, stored and made use of in the known manner.

In the embodiment of FIG. 3, a balance analysis in polar coordinates is effected simultaneously for both reference planes. The parts common to FIGS. 2 and 3 are designated by the same reference numerals respectively and hence are not again described in the following.

In addition to the auxiliary generator 50, the balancing machine of FIG. 3 comprises an auxiliary generator 70 whose stator can be turned by means of a gear 71 meshing with a worm 56 which is driven by the rotor 21' of a motor 82' through a flexible shaft 95. The arrangement thus corresponds to that of motor 82 explained above with reference to FIG. 2.

The machine according to FIG. 3 requires four motors and two potentiometers as well as an additional number of amplifiers. But compared with the apparatus according to FIG. 2, the one shown in FIG. 3 has the advantage that all unbalance components for both reference planes are obtained at the same time. The utilization of the rotor positions and slide-contact positions respectively is effected as described wtih reference to FIG. 2.

If the oscillation pickups are of a type that delivers an increasing voltage with an increasing speed of rotation at constant unbalance, and if the auxiliary generators operate in the same way, the indication is independent of the rotary speed of the workpiece, because the performance is determined only by the ratio of the voltage division, and because the absolute magnitude of the compensation voltage does not influence the indication. The dependence of voltage upon the speed of rotation may be linear, quadratic or of any other kind, provided this dependence is the same in both circuits. Furthermore it is possible, by properly choosing the oscillation pickups and auxiliary generators, to provide for any desired dependence of the unbalance measurement upon the speed of workpiece rotation.

FIG. 4 shows a simple embodiment of a measuring device according to the invention, which basically resembles the embodiment of FIG. 2, corresponding parts being designated by the same reference numerals respectively. For indicating the magnitude of unbalance, a wattmeter 84 has its field coil 85 connected to the same generator leads 15, 16 to which the coils 17, 18 of the induction motor 82 are connected. The moving coil 86 of wattmeter 84 is connected to the same output leads of the amplifier 25 to which the motor coils 19, 20 are connected. The moving coil 86 may instead be connected directly to the leads 31, 32 of the oscillation pickup 12.

When the workpiece is rotating, motor 82 adjusts the stator of the auxiliary generator 50 by means of shaft 53 and worm 52 until the phase position of the unbalance-responsive pickup voltage coincides with that of the auxiliary-generator voltage. The stator position then is indicative of the phase position of the unbalance, and the wattmeter then indicates the magnitude of the unbalance.

The apparatus has an especially simple auxiliary generator 50 for providing a single alternating voltage.

We claim:

1. Apparatus for electrically measuring unbalance of rotating workpieces, comprising journalling structure for supporting the workpiece to be tested, pickup means connected to said structure for providing an alternating pickup voltage in response to unbalance of the rotating workpiece, auxiliary generator means adapted for connection with the workpiece and having first and second alternating reference voltages 90° phase displaced from each other, first and second potentiometer resistors connected to said first and second reference voltages respectively and having each a fixed tap and a slide contact, first and second two-phase induction motors each having a rotor and two field circuits of angularly spaced respective field axes, one field circuit of said first motor being connected to said second reference voltage and one field circuit of said second motor being connected to said first reference voltage, first circuit means connected to said pickup through said tap and said slide contact of said first resistor to provide a first difference voltage from said pickup voltage and from the share of said first reference voltage tapped off from said first resistor, said other field circuit of said first motor being connected to said first circuit means to be excited in dependence upon said first difference voltage; second circuit means connected to said pickup through said tap and said slide contact of said second resistor to provide a second difference voltage from said pickup voltage and from the share of said second reference voltage tapped off from said second resistor, said other field circuit of said second motor being connected to said second circuit means to be excited in dependence upon said second difference voltage; said rotors of said first and second motors being connected with said respective slide contacts of said first and second resistors whereby said motors displace said slide contacts to respective positions indicative of two respective cartesian coordinates of unbalance responded to by said pickup.

2. Apparatus for electrically measuring unbalance of rotating workpieces, comprising journalling structure for supporting the workpiece to be tested, pickup means connected to said structure for providing an alternating pickup voltage in response to unbalance of the rotating workpiece, auxiliary generator means adapted for connection with the workpiece and having first and second alternating reference voltages 90° phase displaced from each other, said generator means having a stator rotationally displaceable for shifting the phase position of said reference voltages with respect to the workpiece rotation, first and second two-phase induction motors each having a rotor and two field circuits of angularly spaced respective field axes, one field circuit of said first motor being connected to said second reference voltage and one field circuit of said second motor being connected to said first reference voltage; means connecting the other field circuit of said first motor to said pickup, and transmission means connecting said rotor of said first motor with said stator for rotationally displacing it to the position of phase compensation between said pickup voltage and said second reference voltage whereby said position is indicative of the angular position of the unbalance responded to; a potentiometer resistor connected to said second reference voltage and having a fixed midtap and a slide contact displaceable over a range including said tap, circuit means connected to said pickup through said tap and said slide contact of said resistor to provide a difference voltage from said pickup voltage and from the share of said second reference voltage tapped off from said resistor, said other field circuit of said second motor being connected to said circuit means to be excited in dependence upon said difference voltage and transmission means connecting said rotor of said second motor with said slide contact whereby said slide contact is placed in a position indicative of the magnitude of the unbalance responded to.

3. Apparatus for electrically measuring unbalance of rotating workpieces, comprising oscillatorily mounted journalling structure for supporting the workpiece to be tested, pickup means connected to said structure for providing an alternating pickup voltage in response to oscillations of said structure due to unbalance of the rotating workpiece, auxiliary generator means adapted for connection with the workpiece and having two output circuits with respective alternating output voltages 90° phase displaced from each other, first and second two-phase motors each having a continuously rotatable rotor and having two alternating-current field circuits for rotating said rotor only when both of said field circuits are simultaneously excited by phase-different voltages respectively, means connecting said two field circuits of each motor to said pickup and to one of said respective two generator output circuits to derive respective excitation voltages therefrom, two compensating means connected to one excitation voltage of each of said respective two motors, each compensating means having a member displaceable to motor stopping position, said two rotors being drivingly connected with said respective two members for displacing them to said respective positions, whereby the respective displacements are representative of two coordinated components of workpiece unbalance responded to by said pickup.

4. Apparatus for electrically measuring unbalance of rotating workpieces, comprising journalling structure for rotationally supporting the workpiece to be tested, pickup means connected to said structure for providing an alternating pickup voltage in response to unbalance of the rotating workpiece, auxiliary generator means adapted for connection with the workpiece and having an alternating output voltage synchronous with the rotation of the workpiece, a reversible electric motor having a rotor continuously rotatable any number of consecutive full revolutions and having two fixed field windings whose respective axes are perpendicular to each other for rotating said rotor in response to phase difference between the excitation of said respective field windings, said two field windings being connected to said respective pickup and generator voltages to derive respective excitation voltages therefrom, phase shift means connected with one of said pickup and generator means for shifting the phase of one of said excitation voltages relative to the other, said phase shift means having a member displaceable to a position of phase coincidence of said two excitation voltages, and transmission means connecting said rotor with said member, whereby said motor displaces said member to said position and said position is indicative of the unbalance to be measured.

5. Apparatus for electrically measuring unbalance of rotating workpieces, comprising journalling structure for rotationally supporting the workpiece to be tested, pickup means connected to said structure for providing an alternating pickup voltage in response to oscillatory unbalance effects due to rotation of the workpiece, auxiliary generator means adapted for connection with the workpiece and having two alternating output voltages 90° phase displaced from each other, first and second potentiometer resistors connected to said generator voltages respectively and having each a fixed tap and a slide contact, first and second reversible two-phase motors each having a rotor and two field circuits for rotating said rotor in response to said respective field circuits being simultaneously excited by phase-different respective voltages, said first motor having one of its two field circuits connected to the one generator voltage to which said second resistor is connected, said second motor having one of its two field circuits connected to the other generator voltage, circuit means connecting said other field circuits of said first and second motors to said pickup voltage through said fixed tap and said slide contact of said first and second resistors respectively for energizing said other field circuits by the difference between the pickup voltage and the respective voltages tapped from said two potentiometers, and mechanical transmission means connecting said rotor of said first and second motors with said slide contacts of said first and second resistors respectively, whereby said motors displace said respective contacts to positions where said differences are zero and said positions are indicative of the unbalance to be measured.

References Cited in the file of this patent

UNITED STATES PATENTS

| | | |
|---|---|---|
| 2,243,379 | Johnson | May 27, 1941 |
| 2,331,733 | Senger | Oct. 12, 1943 |
| 2,636,381 | Hagg et al. | Apr. 28, 1953 |
| 2,648,194 | Jorgensen et al. | Aug. 11, 1953 |
| 2,718,144 | Hornfeck | Sept. 20, 1955 |
| 2,722,830 | Federn et al. | Nov. 8, 1955 |
| 2,783,649 | Hope | Mar. 5, 1957 |
| 2,787,907 | King | Apr. 9, 1957 |
| 2,817,971 | Gruber | Dec. 31, 1957 |
| 2,898,764 | Kinsey et al. | Aug. 11, 1959 |
| 2,919,581 | Lash | Jan. 5, 1960 |
| 2,933,984 | Hack | Apr. 26, 1960 |
| 2,947,172 | King | Aug. 2, 1960 |
| 2,947,173 | Lash | Aug. 2, 1960 |

FOREIGN PATENTS

| | | |
|---|---|---|
| 843,314 | Germany | July 7, 1952 |
| 793,576 | Great Britain | Apr. 16, 1958 |